July 17, 1962  M. S. FRENKEL ET AL  3,044,716
PULVERISING MILLS
Filed June 2, 1960  2 Sheets-Sheet 2
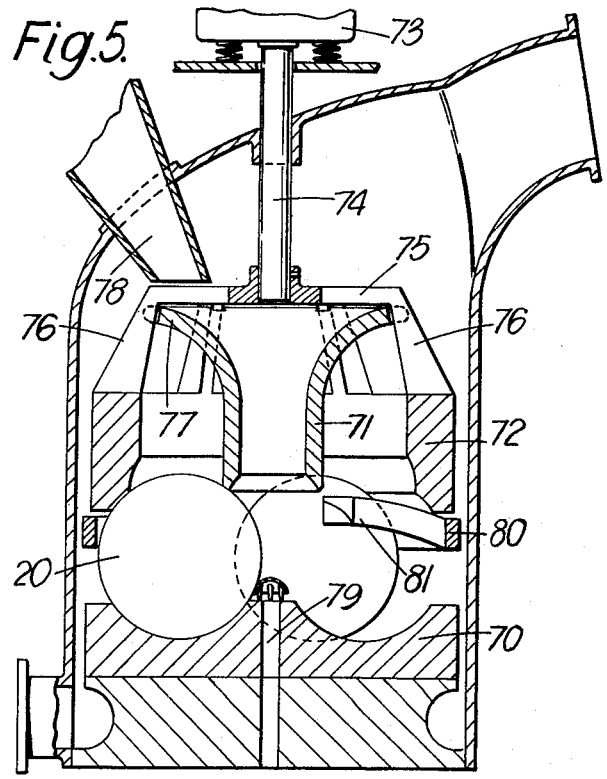
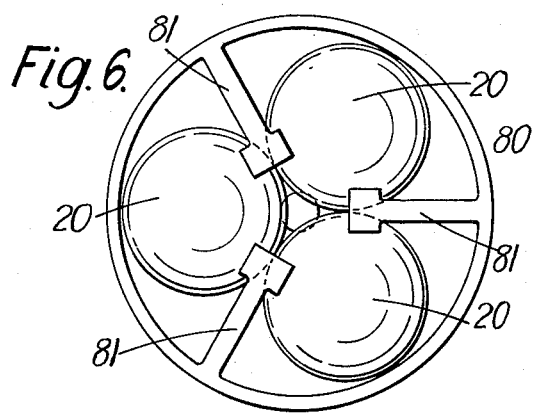
INVENTORS
MEYER S. FRENKEL
PAUL MEYER
BY. WATSON COLE GRINDLE + WATSON
ATTORNEYS.

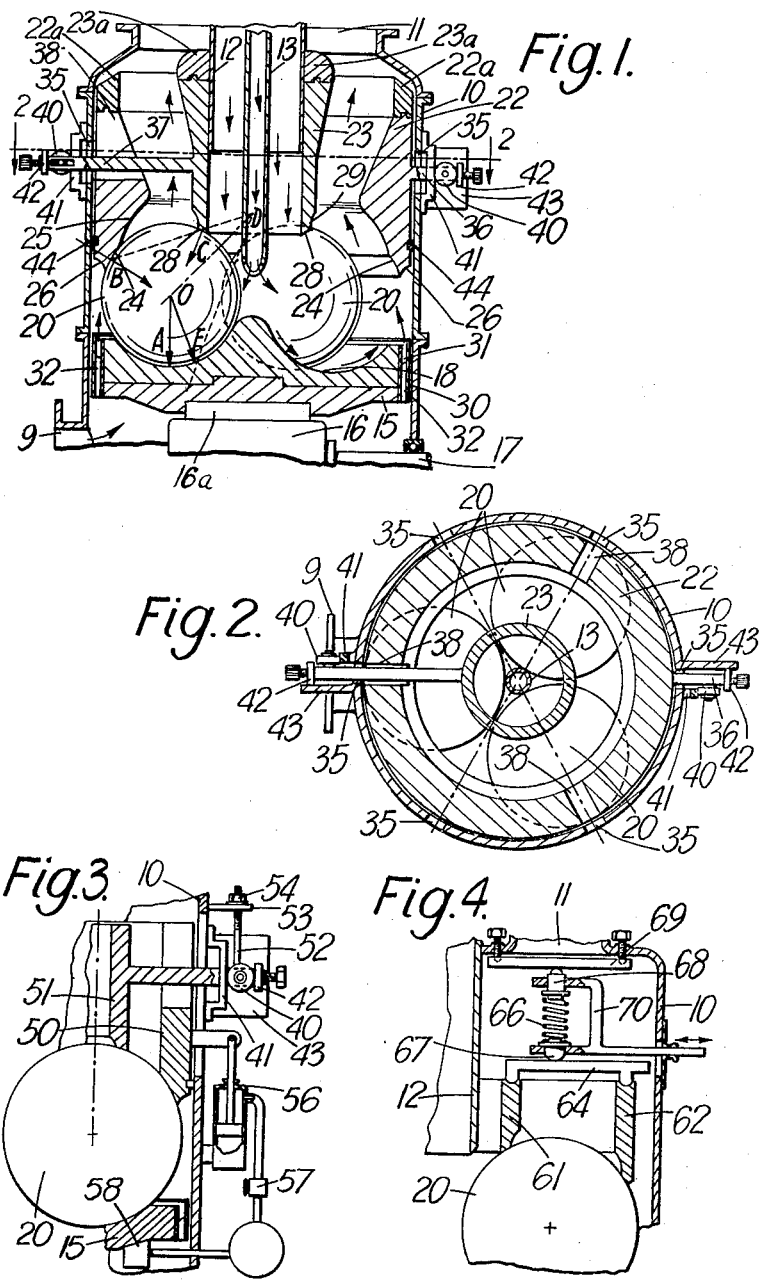

United States Patent Office 3,044,716
Patented July 17, 1962

3,044,716
PULVERISING MILLS
Meyer Schlioma Frenkel and Paul Meyer, London, England, assignors to Frenkel C-D, Aktiengesellschaft, Vaduz, Liechtenstein, a Liechtenstein company
Filed June 2, 1960, Ser. No. 33,424
Claims priority, application Great Britain June 5, 1959
20 Claims. (Cl. 241—103)

The invention relates to pulverising mills of the kind comprising a table providing an upwardly facing annular track of concave cross-section, a ring of balls supported on said track for movement around the track, means for guiding and loading the balls against the track, means for effecting relative rotation between the table and the loading means about the centre of the track whereby the balls may be caused to roll around the track to pulverize material therein, means for delivering material to be pulverised into the said track and means for removing pulverised material. Mills of this kind are used for pulverising coal, the materials used in making cement as well as minerals used in other industries and for other purposes.

Mills of the above kind are subject to considerable wear of the balls, the track and the loading means and a difficulty which arises in that as wear occurs the parts, particularly the track, change their configuration in a manner which is detrimental to effective operation. It is an object of this invention to reduce this difficulty.

The invention provides a pulverising mill comprising a table providing an upwardly facing annular track of concave cross-section, a set of balls supported on said track for movement around the track, means for guiding and loading the balls against the track comprising at least two rings substantially coaxial with the said track and contacting the said balls on their upper parts, at least one of the rings engaging said balls at positions only outside their pitch circle, and the rings being separate from one another and each being movable independently of the other ring towards and away from the track, means for loading at least one of the said rings against the balls and means for adjusting the said loading on at least one ring; means for effecting relative rotation between the said track, the balls and the rings whereby the balls may be caused to run around the track and to pulverize material therein, means for delivering material to be pulverized into the said track and means for removing pulverized material.

One of the reasons for change in the configuration of the track is that due to the centrifugal force acting on the balls they apply a radially outward force onto the track which tends, by wear, to enlarge the track in the radial direction. By the use of two rings engaging the balls as aforesaid the ring may not only be suitably guided and loaded to make up the necessary pulverising load but the radially inward component applied by the rings may be arranged to balance or exceed the outward centrifugal force on the balls. Balanced forces will tend to result in equal wear on both sides of the track whereas an excess inward force will tend to cause extra wear on the inner edge of the track so that as the diameter of the balls reduces due to wear, their pitch circle also tends to reduce and their circumferential separation may be kept substantially constant. Both these results have advantages.

It is an advantage of the invention that by providing means for controlling the effect on the track of the outward centrifugal force on the balls, it becomes practicable, for a given track diameter and speed of rotation, to increase the weight of the individual balls and to decrease their number without causing undue wear on the track. It can be proved that by increasing the size of the balls, with a consequential increase in the weight of individual balls and a reduction of the number which can be fitted into a track of given diameter, the output of a mill at a given speed of rotation increases until there are only two balls each of a diameter equal to that of the track. However for practical reasons the preferred number of balls which should be used is three. In addition to the advantage of high output the use of two or three large and heavy balls has the advantages that each ball can afford to lose, by wear, a substantial amount of material so that the running life of the mill before renewal of the balls is necessary is increased and a common loading means for the balls can be used without risk of uneven loading of the balls as may occur in mills with more than three balls. It will be appreciated that in the case of a large mill such as is required for power stations, the weight of the individual balls, when only two or three are used, is so large that the centrifual forces and gyroscopic couples become so great that unless they are controlled the track life becomes too short to be acceptable. The invention provides such a control. In the case of a large mill as just mentioned, the weight of the balls themselves provides a considerable part of the pulverising load.

The loading on said rings is preferably made adjustable in magnitude to enable different pulverising loads on the table and different rotational speeds to be used although it will be clear that to obtain the desired wear conditions described above such loads and speeds will be severely limited, i.e. speed will have to increase as some function of the load, and the range of the arrangement may be further limited by the conditions required for a ball motion in which under gyroscopic and other couples the balls rotate freely for spherical wear-down and at the same time describe with their centres a circular path, without oscillations about that path from these causes which would make for accelerated wear and unbalanced forces.

This limitation may be reduced to some extent by providing means for varying the position of the contact-area of one of the said rings, e.g. by providing in said means for guiding and loading said balls against the track at least one alternative ring co-axial with the track for contacting the upper parts of said balls outside their pitch circle and means for bringing either one of said rings into contact with said balls and leaving said other ring out of contact with the said balls, or for bringing both rings into contact with the balls.

However, different materials and different degrees of fineness of grinding demand considerably different table loads and it is also desirable to be able to vary throughput by variation of speed.

In order to enable greater variations in loading and speeds to be made it is preferred that the other of the two rings aforesaid engages the upper parts of the balls inside their pitch circle and applies to the balls pressure towards the track with a radially outward component.

In order that a desired ratio of the inward and outward forces derived from the two rings may be obtained for maintained for opposing centrifugal force independently of adjustment of the total load, the rings are independently movable towards and away from the track and the loads on the rings may be independently variable, preferably during operation of the mill.

Particularly for the preferred embodiments with three or even two large balls, which on account of their large mass and moment of inertia are subject to large centrifugal and gyroscopic effects, as well as pseudo-gyroscopic effects due to contact forces, these can be controlled by loading and guide-rings contacting the balls inside as well as outside the pitch circle, to provide ball rotation for uniformly spherical wear-down with substantially no departure from a circular motion of translation of the ball centres due to the above effects.

It is preferred that the pressure of the rings on the balls is derived wholly, or at least mainly, from the weight of the rings or dead-load added thereto, because with this mills may be designed to require no attention to loading under wear-down in known and reasonably uniform conditions.

The pressure may, if desired, be provided in part by springs although this has the drawback of requiring re-tensioning during wear-down. Pressure may also, if desired, be provided in part by fluid pressure which can easily be adjusted and with which damping and shock-absorbing provisions may easily be included in the hydraulic or pneumatic circuit.

With regard to out of balance forces which may be caused by excessively hard particles or lumps causing one or another ball to ride up, the mill may be considered as an oscillatory system. On account of the large ball mass and using dead weight loading of the ring or rings the system has a very low natural frequency tending to keep oscillations down and the ball continuously in grinding relationship to the track, to which any damping means provided in the guide or loading means will contribute its effect.

From the point of view of power, the preferred embodiment with its ball contact inside and outside the pitch circle enables these contacts to be placed so that a ball motion with minimum slip at the load rings and giving good grinding motion relative to the track can be suitably combined.

It is further preferred that the track has the cross-section of a segment of a circle and that the radius of the circle is substantially equal to that of the balls.

The means for removing the pulverised material may comprise an annular stream of gaseous carrier medium which passes upwardly around the periphery of the table and entrains powdered material discharged from the table. The gaseous carrier may also serve to dry the material. The stream may carry the material to a classifier integral with or external to the mill, or to other equipment for the treatment, use or storage of the material. As has already been stated, the use of only three balls arranged as described, enables an increased throughput to be obtained using a given size of table and this, in turn, results in a more economical use of the gaseous stream and the power required to produce it. There may be an outlet passage for the gaseous stream between the loading and guiding rings. Means for directing a jet of gaseous medium from the centre onto the track between the balls for improving the consistency of the bed and for feed-drying, may be provided.

More than two loading and guiding rings may be provided and arranged for simultaneous or selective use.

A device sensitive to changes in performance due to varying feed properties, effect of wear-down and the like may regulate means for adjusting load or speed or both.

Some specific examples of mills according to the invention will now be described with reference to the accompanying diagrammatic drawings, in which:

FIGURE 1 is a vertical section through one form of mill,

FIGURE 2 is a section on the line 2—2 in FIGURE 1,

FIGURE 3 is a part section corresponding to FIGURE 1 of a second form of mill,

FIGURE 4 is a part vertical section showing another construction,

FIGURE 5 is a section corresponding to FIGURE 1 of another construction of mill, and FIGURE 6 is a plan view showing a ball cage used in the construction of FIGURE 5.

In the construction shown in FIGURES 1 and 2 there is a casing 10 which contains the operative parts of the mill and has an inlet 9 for carrying and drying air and an outlet 11 for particle bearing air leading to a classifier, not shown. An integral classifier (not shown) may, alternatively, be provided. The casing also has an inlet chute 12 for material to be pulverised and an inlet pipe 13 for compressed air, which may also be heated.

Rotatable within the casing is a table 15 which is carried on the output shaft 16a of a gearbox 16 driven by a shaft 17 from an external motor, not shown. The table has an annular groove 18 having a cross-section of the segment of a circle.

The groove 18 forms a track on which run three balls 20, the balls, as seen in FIGURE 2, being of such a size that they nearly touch to form a continuous ring around the track. The groove has a cross-section with a radius equal to that of the balls.

Above the balls there are two separately constructed co-axial guiding and loading rings 22, 23 which are independently and freely movable up and down, the rings being guided as later described. The outer ring 22 has a surface 24 which engages the balls on their upper outer quadrants (i.e. outside the pitch circle of the balls) as seen in FIGURE 1. Accordingly the weight of the ring, which is substantial, applies a load on the balls having both downward and radially inward components. The surfaces 25, 26 of the ring adjacent to the surface 24 are so formed that as the surface 24 wears away the forces applied to the balls vary as required in position on the ball surface (determined by the centre of the arc of contact) and in magnitude or remain substantially constant, allowance being made for wear of the balls.

The inner ring 23 has a surface 28 which engages the balls on their upper inner quadrants and accordingly the weight of the ring, which in this example is substantial, but less than that of ring 23, applies a load on the balls having both downward and radially outward components. The inward component from ring 22 is greater than the outward component from ring 23 by an amount which, as later described more fully, more than balances the outward centrifugal force acting on the balls as they rotate so that the resultant force from the balls is downward and inward. Accordingly as the balls run around the track they are free to rotate under the interplay of inertia and friction forces and couples while the ball centres are constrained to follow their circular path. The balls tend to wear the inner side of the track to a greater extent than the outer and the balls tend to move inwardly as wear proceeds. In this way the circumferential spacing between the balls may be kept small and substantially constant as the diameter of the balls decreases. Compensation may also be obtained for differences in the wear rates of the inner and outer sides of the track.

In an alternative arrangement, the inward force from ring 22 is made equal to the total outward force on the balls so that the balls tend to wear both sides of the tracks evenly and to maintain the circular configuration of the section of the track while increasing the depth thereof.

The surface 29 of the ring 23 is so formed that as the surface 28 and the balls wear, the outward force remains substantially constant, or it may be arranged to vary in a desired manner.

Surrounding the table and fixed thereto is a guide ring 30 providing with the periphery of the table an annular passageway 31 for the air which enters the casing at 9. The guide ring is attached to the table by guide vanes 32.

In use, material to be pulverized is fed through chute 12 and ring 23, which forms the mouth of the chute, onto the centre of the table and into the track 18. As the table rotates, the balls are caused to run around the track and pulverise the material. The pulverised material is entrained in the air passing upwardly through passageway 31 while ungrindable material is discharged over the outer rim of the table and removed through a trap-door of known construction (not shown). This air carries the material upwardly between the rings 22, 23 and through the outlet 11 to the classifier. Air is also fed downwardly through the pipe 13 which helps to clear the centre of the table and to feed the material outwardly and also to dry the material and avoid clogging of the mill with a mass of adherent wet feed or partially ground particles.

To effect the guiding of the rings 22, 23 and to hold them against rotation, each ring has three equally spaced radial arms which pass outwardly through slots 35 in the casing. One of the arms on the ring 22 is shown at 36 and one of the arms on the ring 23 is shown at 37, these arms passing through slots 38 in the ring 22. Each of the arms 36, 37 has, at its outer end, a roller 40 which runs on a guide surface 41 fixed on the casing in order to guide the ring vertically. The rollers are adjustable radially of the ring so that the ring may be centred on the balls. Each arm also has a roller 42 which runs on a fixed vertical guide 43 to hold the rings against rotation. To prevent loss of air through the slots 35, the outer ring has a sealing ring 44 working on the inside of the casing.

In the above described example the load on the balls is derived from the dead weight of the two rings 22, 23. This load may be varied by adding weights to the rings (e.g. by adding additional rings as shown at 22a and 23a).

In the arrangement shown in FIGURE 1 the load of the outer ring 22 acts on each ball in the direction of the arrow BO and that of the inner ring 23 in the direction of the arrow CO. These forces in combination with the weight of the ball acting in the direction OA produce an inwardly inclined resultant OE acting on the table. With this loading, the axis of the rolling which forms a component of the ball motion will be approximately OD which bisects angle BOE. The centre C of the arc of contact of the inner ring 23 is arranged to be on or near line BD to minimise the relative motion and hence the wear between the ball and the rings. In use rotation of the ball takes place about the axis through O perpendicular to the plane of the drawing under gyroscopic and pseudo-gyroscopic couples. The rings 22, 23 act, as already explained, to constrain the balls to follow a circular path.

FIGURE 3 shows a construction in which the loading and guiding of the balls is effected wholly or in part by rings engaging the balls on the outside of the pitch circle. There are two rings 50 and 51 which may be used alternatively or together according to the loading on the balls and the speed of rotation desired. Thus for higher speeds the outer ring 50, which will apply a higher inward thrust component on the balls, is used. When a heavy pulverising load is required both rings are used. Means such as the tie indicated at 52 are provided for holding the rings out of use. Each ring has three such ties equally spaced around the ring and each tie passes through a fixed bracket 53 on the casing and has a nut 54 bearing on the bracket for releasably holding the ring raised away from the balls.

FIGURE 3 also shows another way in which the loading and load distribution on the balls may be varied. There is a device 58 for sensing out of balance load and for selectively actuating, in accordance with out of balance loads, three circumferentially spaced hydraulic or pneumatic rams 56 associated with each ring 50 and 51 by which additional downward force may be applied to the ring to increase the load of the ring on the balls. Alternatively the rams may, if desired, be arranged to apply an upward force to the ring to reduce the load of the ring on the balls. A choke 57, which is preferably adjustable, may be incorporated in the supply to the ram so that there is an appreciable damping effect on movements of the ring.

FIGURE 4 shows, diagrammatically, an arrangement in which the loading of the balls is effected, to a substantial extent, by springs. As in the first example, there are two rings 61, 62 which engage the balls inside and outside their pitch circle but in this case the rings are lighter and their weight constitutes only a part of the load on the balls. At three equally spaced positions around the rings there are spring loading means of which one will be described. Bearing on the two rings there is a bridge member 64 to which downward pressure is applied by a spring 66 acting through a pusher 67. The spring reacts, through a second pusher 68, against a bar 69 supported on the casing and adjustable vertically to vary the load on the spring. The two pushers 67, 68 are carried in a fork 70 which is movable radially by means (not shown) outside the casing. Such movement varies the point of application of the spring pressure to the bridge 64 and hence the distribution of the pressure between the rings 61 and 62 and the direction of the resultant force of the balls on the table.

FIGURE 5 shows an arrangement in which the table 70 remains stationary and the loading rings 71, 72 are rotated to roll the balls 20 around the track. Moreover the load on the balls is derived, in part, from the weight of the driving motor (not shown) and a gear box 73. The gear box is held against rotation but vertical movement of the box, and the motor is permitted. The output shaft 74 of the gear box is coupled to a spider 75 of which the arms 76 are attached to the outer ring 72. The inner ring 71 is formed at its upper end as a funnel 77 into which the material to be pulverised is fed (between arms 76) from a chute 78. The funnel and inner ring 71 may be free for independent vertical movement (as is shown in FIGURE 5) and driven by the arms 76. A duct 79 for air is provided in the table.

As the balls become smaller due to wear, their spacing tends to increase with the result that, unless steps are taken such as those herein described to avoid the result, it is possible for the spaces between adjacent balls to be different with a consequential out of balance effect on the table bearings during rotation. If desired means are provided as seen in FIGURE 3 and above described which are sensitive to such out of balance, and are arranged to increase the pressure loading (e.g. fluid or spring pressure or even dead load) on an outer ring and so to increase the inward thrust component. This will increase the wear on the inner wall of the track groove so that the balls will tend to close in and their initial spacing be restored. Loading controlled in this way may be employed in any of the constructions described and in a modified form the control is arranged to reduce the load on an inner ring.

In FIGURES 5 and 6 there is shown a cage 80 for the balls. This cage initially rides rather high on the balls, which nearly touch. However as the balls and cage wear, the cage gradually sinks on the balls and the arms 81 of the cage tend to enter between the balls and keep them evenly separated.

We claim:
1. A pulverising mill comprising a table providing an upwardly facing annular track of concave cross-section, a set of balls supported on said track for movement around the track, means for guiding and loading the balls against the track comprising at least two rings substantially co-axial with the said track and contacting the said balls on their upper parts, at least one of the rings engaging said balls at positions only outside their pitch circle, and the rings being separate from one another and each being movable independently of the other ring towards and away from the track, means for loading at least one of the said rings against the balls and means for adjusting the said loading on at least one ring; means for effecting relative rotation between the said track, the balls and the rings whereby the balls may be caused to run round the track and to pulverise material therein, means for delivering material to be pulverised into the said track and means for removing pulverised material.

2. A pulverising mill as claimed in claim 1 in which the other of said rings engages the balls inside their pitch circle.

3. A pulverising mill as claimed in claim 1 in which there are three balls in the set close to one another around the track.

4. A pulverising mill as claimed in claim 1 comprising means for rotating the said table and means for preventing the rings from rotating.

5. A pulverising mill as claimed in claim 1 and including means for centring at least one of the rings.

6. A pulverising mill as claimed in claim 1 having means for adjusting the loading on one ring independently of the loading on any other ring.

7. A pulverising mill as claimed in claim 1 in which the cross-section of the track is a segment of a circle.

8. A pulverising mill as claimed in claim 1 in which the other of said rings engages the balls only inside their pitch circle, and the means for delivering material into the track comprise a conduit of which the inlet mouth is constituted by said other ring.

9. A pulverising mill as claimed in claim 1 in which the means for removing pulverised material comprise means for directing an air stream upwardly around the periphery of the table and between the two rings.

10. A pulverising mill as claimed in claim 1 in which at least one of said rings has, immediately above the area of contact with the balls, a surface which faces downwardly and over the balls.

11. A pulverising mill as claimed in claim 10 in which the said surface is concavely curved in cross-section.

12. A pulverising mill as claimed in claim 1 and including means for directing a jet of gaseous medium into the ring of balls.

13. A pulverising mill as claimed in claim 1 and including a cage for the balls.

14. A pulverising mill as claimed in claim 1 in which the pressure of at least one ring on the balls is derived at least mainly from dead load.

15. A pulverising mill as claimed in claim 1 in which the pressure of at least one ring on the balls is provided at least in part by springs.

16. A pulverising mill as claimed in claim 1 in which the pressure of at least one ring on the balls is provided at least in part by fluid pressure.

17. A pulverising mill as claimed in claim 1 including means for holding the table stationary and means for rotating the rings.

18. A pulverising mill comprising a rotatable table providing an upwardly facing annular track of concave cross-section, a set of balls supported on said track for movement around the track, two rings co-axial with the track and contacting the balls on their upper parts, one ring engaging the balls at positions only outside their pitch circle and the other ring engaging the balls at positions only inside their pitch circle, the rings being separate from one another and movable independently of each other towards and away from the track, means for applying an adjustable load to at least one of the rings towards the table, means for holding the rings against rotation while permitting movement thereof towards and away from the table, means for rotating the table, means for delivering material to be pulverized into the said track and means for removing pulverized material.

19. A pulverising mill as claimed in claim 18 in which there are three balls in the set, positioned close to one another around the track.

20. A pulverising mill comprising a table providing an upwardly facing annular track of concave cross-section, a set of balls supported on said track for movement around the track, means for guiding and loading the balls against the track comprising at least two rings substantially co-axial with the said track and contacting the said balls on their upper parts, at least one of the rings engaging said balls at positions only outside their pitch circle, and the rings being separate from one another and each being movable independently of the other ring towards and away from the track, guide means constraining the rings for independent movement towards and away from the track and holding the rings against relative rotation about the axis of the rings, means for loading at least one of the said rings against the balls and means for adjusting the said loading on at least one ring; means for effecting relative rotation between the said track, the balls and the rings whereby the balls may be caused to run around the track and to pulverize material therein, means for delivering material to be pulverized into the said track and means for removing pulverized material.

References Cited in the file of this patent

UNITED STATES PATENTS

| | | |
|---|---|---|
| 342,093 | Hill | May 18, 1886 |
| 584,086 | Woods | June 8, 1897 |
| 2,906,467 | Poole | Sept. 29, 1959 |